United States Patent
Martínez Sanz et al.

(10) Patent No.: US 9,032,625 B2
(45) Date of Patent: May 19, 2015

(54) METHOD FOR PRODUCING A SOLAR POWER RECEIVING TUBE AND RESULTING TUBE

(75) Inventors: Noelia Martínez Sanz, Seville (ES); Javier Asensio Pérez Ullivarri, Seville (ES); Pablo José Bombin Ortega, Seville (ES); Javier Peláez Fombellida, Seville (ES); José Ángel Rico Sánchez, Seville (ES)

(73) Assignee: ABENGOA SOLAR NEW TECHNOLOGIES, S.A., Seville (ES)

( * ) Notice: Subject to any disclaimer, the term of this patent is extended or adjusted under 35 U.S.C. 154(b) by 338 days.

(21) Appl. No.: 13/500,218

(22) PCT Filed: Oct. 4, 2010

(86) PCT No.: PCT/ES2010/000406
§ 371 (c)(1),
(2), (4) Date: Jun. 14, 2012

(87) PCT Pub. No.: WO2011/042580
PCT Pub. Date: Apr. 14, 2011

(65) Prior Publication Data
US 2012/0247456 A1    Oct. 4, 2012

(30) Foreign Application Priority Data
Oct. 5, 2009   (ES) ................... 200901950

(51) Int. Cl.
*F24J 2/46*   (2006.01)
*F24J 2/05*   (2006.01)
*F24J 2/50*   (2006.01)

(52) U.S. Cl.
CPC .......... *F24J 2/4612* (2013.01); *Y10T 29/49826* (2015.01); *Y10T 29/49968* (2015.01);
(Continued)

(58) Field of Classification Search
CPC ......... H01J 31/127; H01J 29/94; H01J 7/183; H01J 7/18; B22F 2998/00; Y02E 10/44; F24J 2/055; F24J 2/4612; F24J 2/505; F24J 2/465; F24J 2/4636; F24J 2/4616; F24J 2002/4681; Y10T 29/49968; Y10T 29/49355
USPC ........ 29/525.14, 890.033; 126/651, 652, 653, 126/655, 684
See application file for complete search history.

(56) References Cited

U.S. PATENT DOCUMENTS 4,186,725 A     2/1980  Schwartz
4,231,353 A *  11/1980  Kanatani et al. .............. 126/652

(Continued)

FOREIGN PATENT DOCUMENTS

CN    101063560    10/2007
CN    201003869    1/2008
(Continued)

*Primary Examiner* — Alexander P Taousakis
*Assistant Examiner* — Lee A Holly
(74) *Attorney, Agent, or Firm* — Hamre, Schumann, Mueller & Larson, P.C.

(57) ABSTRACT

The invention relates to a method for producing a solar power receiving tube and to the resulting tube, which is of the type that includes: an outer glass tube, an inner metal absorber through which a heat-transfer fluid flows, and an intermediate area in which the vacuum is produced. The method comprises the following steps:
i. Production of the metal tubes
ii. Production of the glass tubes: namely a longer central glass tube and two shorter glass tubes for the ends.
iii. Process for the production of the Kovar rings or glass-metal transition elements
iv. Process for the welding of the Kovar rings to the tubes
v. Process for the production of the bellows or expansion compensating devices assemblies
vi. Assembly of the products obtained in the preceding operations
vii. Creation of the vacuum and anodising of the welds.

12 Claims, 6 Drawing Sheets

(52) U.S. Cl.
CPC ............ *Y10T29/49355* (2015.01); *F24J 2/055* (2013.01); *F24J 2/4616* (2013.01); *F24J 2/4636* (2013.01); *F24J 2/465* (2013.01); *F24J 2002/4681* (2013.01); *Y02E 10/44* (2013.01); *F24J 2/505* (2013.01)

(56) References Cited

U.S. PATENT DOCUMENTS

| | | | | |
|---|---|---|---|---|
| 4,294,232 | A | * | 10/1981 | Boy-Marcotte et al. ...... 126/653 |
| 4,834,066 | A | * | 5/1989 | Collins et al. ................. 126/654 |
| 6,705,311 | B1 | * | 3/2004 | Schwartzman et al. ...... 126/657 |
| 8,474,285 | B2 | * | 7/2013 | Bartsch et al. .................... 65/87 |
| 2005/0089627 | A1 | * | 4/2005 | Chuntonov ..................... 427/58 |
| 2007/0209658 | A1 | | 9/2007 | Riffelmann et al. |
| 2009/0188785 | A1 | * | 7/2009 | Hartig ...................... 204/192.15 |
| 2010/0129606 | A1 | * | 5/2010 | Rendon Granados ........ 428/156 |
| 2010/0326429 | A1 | * | 12/2010 | Cumpston et al. ............. 126/710 |

FOREIGN PATENT DOCUMENTS

| | | |
|---|---|---|
| CN | 101245954 | 8/2008 |
| FR | 2 470 939 | 6/1981 |
| WO | WO 2006062385 A1 * | 6/2006 |

* cited by examiner

METHOD FOR PRODUCING A SOLAR POWER RECEIVING TUBE AND RESULTING TUBE

TECHNICAL FIELD OF THE INVENTION

The present invention aims to present the sequence of assembly of the different individual components that make up a solar power receiving tube and the resulting tube.

BACKGROUND OF THE INVENTION

The general principle of solar thermal technology is based on the concept of the concentration of solar radiation to produce generally steam, which is then used in standard power plants.

Solar energy collection, which has a relatively low density, is one of the greatest challenges in the development of solar thermal power plants. There are two types of solar concentrators: linear concentrators and point concentrators. Linear concentration is easier to install since it has fewer degrees of freedom, but it has a lower concentration factor and therefore it can reach lower temperatures than point concentration technology.

That is why an effort is made in order to progress in the development of the receiving tubes used in linear concentration, to try to increase the concentration factor achieved therein and to reduce losses, such that the overall performance of the concentration plant increases.

The invention before us explains the procedure of assembly of one of these receiving tubes of improved technology with respect to what exists in the state of the art, as well as the resulting tube.

In general, a receiving tube consists of two concentric tubes between which the vacuum is produced. The inner tube, through which the fluid that is heated flows, is made of metal and the outer tube is made of glass, usually borosilicate.

Between the metal tube and the glass tube, at the ends of the tube, there will be installed a series of elements or devices each with a specific function. The most common are: expansion compensating device or bellow, evaporable getter or vacuum detector, non-evaporable getter or vacuum-enhancing system and different connection elements necessary between these devices.

As for the background on this type of procedures none in particular are worth mention since, depending on the components of the specific tube that is going to be manufactured, the assembly procedure shall be conducted in one way or another. As an example of tube, but that has different design elements and located in different places and not being an object of this document to detail them, patent US 20070209658 by SCHOTT can be mentioned.

DESCRIPTION OF THE INVENTION

The invention consists of developing an efficient assembly procedure for a receiving tube of those used in linear solar concentrators, either for parabolic trough or Fresnel concentrators.

The main parts that comprise the receiving tube are:
Expansion compensating system or bellows.
Cover
Vessel
Glass/metal transition element or Kovar ring.
Non-evaporable loop getter and closure system
Evaporable getter with attachment clip
Borosilicate tubes.
Metal tube.

These are all individual elements with the exception of the expansion compensating device assembly or bellows which brings together, in an independent assembly process, the manufacture of all the expansion compensating mechanical assembly, as well as the inclusion of the evaporable and non-evaporable getters and their associated supports.

For non-evaporable getters or vacuum-enhancing system, the support consists of a cable wherein the getter material pills are inserted through a drill made in the center. The cable has a closure with a female part and a male part which will be joined when all the pills are inserted.

For the evaporable getter or vacuum detector, the support consists of a clip with a circular end wherein the evaporable getter material pill will be introduced.

The complete manufacturing procedure of the receiving tube encompasses, therefore, the following steps:
  i. Process for the production of the metal tubes (generally made of steel)
  ii. Process for the production of the glass tubes (there are three, central with approximately 3.6 m in length and two for the ends of approximately 0.2 m in length)
  iii. Process for the production of the Kovar rings
  iv. Process for the welding of the Kovar rings to the tubes
  v. Process for the production of bellows assemblies (there are two, one for each end of the tube). The steps to be followed to mount this assembly will be detailed in the preferred embodiment.
  vi. Assembly of the preceding products
  vii. Creation of the vacuum in the intermediate zone, between the glass and the metal tube and applying anodising spray to the welds.

Next and with help of the figures, a more detailed explanation of all and each one of the stages that each of the steps of the procedure comprises will be provided.

DESCRIPTION OF THE DRAWINGS

To complete the description being made and with the object of helping to a better understanding of the invention, a set of drawings is accompanied where, with illustrative character and without limitation, the following has been represented.

LIST OF REFERENCES (1) Expansion compensating device or bellow
(2) Vessel
(3) Cover (4) Bridge of fixation
(5) Clip-type support of evaporable getter
(6) Evaporable getter pill
(7) Closure of the of the non-evaporable getter, female part; (7') male part
(8) Non-evaporable getter pills
(9) Non-evaporable getter cable
(10) Attachment clamps
(11) Branched connector configured to create vacuum
(12) Shorter glass tube
(13) Other shorter glass tube
(14) Central glass tube Preferred Embodiment Of The Invention To achieve a better understanding of the invention, the manufacturing procedure according to a preferred embodiment will be described next.

As stated earlier, the procedure includes a series of main steps (i-vii) the respective stages of which will be studied.

i. Process for the production of the metal tubes

In a preferred embodiment these are tubes of steel which are polished, cleaned and a selective coating is applied by the sputtering technique.

The steel tube is heated so that it acquires an outer oxide layer on which the different layers will be applied.

ii. Process for the production of the glass tubes

The glass tube as a whole is composed of three borosilicate tubes: the central one 14 with a length of 3.6 m and two 12, 13 for the ends with a length of 0.2 m. One of the tubes of the ends will have in addition a branched connector for the creation of the vacuum by pump.

iii. Process for the production of the Kovar rings

The Kovar rings are the transition element for carrying out the binding of steel with glass, since it is an alloy of iron, cobalt and nickel which has a coefficient of thermal expansion very close to that of the glass.

iv. Process for the welding of the Kovar rings to the tubes.

Once received the three glass tubes, these can be cleaned in this moment and are welded to the Kovar piece in the following way:

Welding the first glass tube with a length of 0.2 m to the Kovar piece by one of its ends (glass-metal welding).

Welding the second glass tube with a length of 0.2 m to the Kovar piece by one of its ends (glass-metal welding).

Then a glass-glass welding is done between the free ends of the Kovar piece of the smaller length tubes 12, 13 and the two ends of the tube 14 of 3.6 m in length.

Once the previous process is completed, the tube is taken to the sol-gel station (anti-reflective coating) where the tube is cleaned through washing with water or ultrasound, it is dried and it is immersed in a vat for the application of the anti-reflective. Next it is introduced in an oven with the purpose of consolidating the sol-gel layer and releasing the stress of the glass due to the welding. This heat treatment for releasing stress could also be carried out just after carrying out the glass-metal welding and before taking the tube to the sol-gel station.

Then the temperature of the tube is reduced and a hydrophobic treatment is provided for achieving a water-repellent surface.

Next the tube is dried with heat or air.

v. Process for the production of bellows assemblies

These are the expansion compensating devices (1) which are bellows-shaped plus all the elements that are bounded to them, such as the evaporable getter and non-evaporable getters with their supports.

For the evaporable getter the support consists of a clip-type support (5) with a circular end wherein the evaporable getter material pill (6) will be introduced.

For the non-evaporable getters the support consists of a cable (9) wherein the getter material pills (8) are introduced through a drill made in the center and the cable has a closure with a female part (7) and a male part (7') that will be joined in the moment that all the pills (8) are in the cable.

Following the figures consecutively from FIG. 1 to FIG. 12, the steps of this process are:

Step 1: Bellows welding (1)+vessel (2)→Product 1
Step 2: Cover welding (3)+Product 1→Product 2
Step 3: Welding bridge of fixation (4) of the evaporable getter at the bottom of Product 2→Product 3
Step 4: Introducing evaporable getter pill (6) in the dip-type support (5)→Product 4
Step 5: Assembling Product 4 in product 3→Product 5
Step 6: Cable Assembly (9)+female part of the closure (7) of the non-evaporable getter cable→Product 6
Step 7: Product 6 Assembly+Non-evaporable getter pills (8)→Product 7
Step 8: Product 7 Assembly+male part of the closure (7') of the non-evaporable getter cable→Product 8
Step 9: Product 5 Assembly+Product 8→Product 9
Step 10: Assembly of the attachment clamps (10) of the non-evaporable getter→Product 10 or whole assembly vi. Assembly of the preceding assemblies, with the following options:

1) The metal absorber tube is located inside the glass tube and then the bellow assembly is welded at both ends (product 10). For this, the vessel (2) is bound by welding with the wall of the metal absorber tube (bellow assembly or product 10 binding to the absorber tube) and the cover (3) with the Kovar ring (bellow assembly or product 10 binding to the glass tube).

2) Binding of the bellow assembly or product 10 by welding the cover (3) to the Kovar ring of the glass tube at both ends of the tube, then the metal absorber tube is introduced inside the assembly by any of the ends and by both ends the part of the vessel (2) of the bellow assembly or product 10 is welded to the wall of the metal absorber tube.

3) At one end of the glass tube the bellow assembly or product 10 is welded by its cover (3) to the Kovar ring and then the metal absorber tube is introduced by the other end, the metal absorber tube is welded to the cover (3) of the bellow assembly or product 10 of the first end and then by the other end of the glass tube the vessel (2) and absorber tube, cover (3) and Kovar ring of the glass tube are welded.

4) The bellow assembly or product 10 is welded by its vessel (2) to a first end of the metal absorber tube, the glass tube is introduced by the other end and the cover (3) of the bellow assembly or product 10 is welded to the Kovar ring of the first end of the glass. The bellow assembly or product 10 is placed on the other end and vessel (2) and absorber tube cover (3) and Kovar ring are welded.

Note: In any of the assembly processes described above is desirable, though not essential, to perform a preload of the bellow assembly before carrying out the welding of said assembly with the metal tube. This preload involves a series of advantages, such as the fact that it fixes possible manufacturing deviations, allows to place the expansion compensating device in a position that prepares it to receive tensile-compressive loads, it can be used to pretension the glass tube and ensure a smaller deflection during operation, as well as it guarantees a better performance in exceptional circumstances of assembly, transport, etc.

Figure 1:
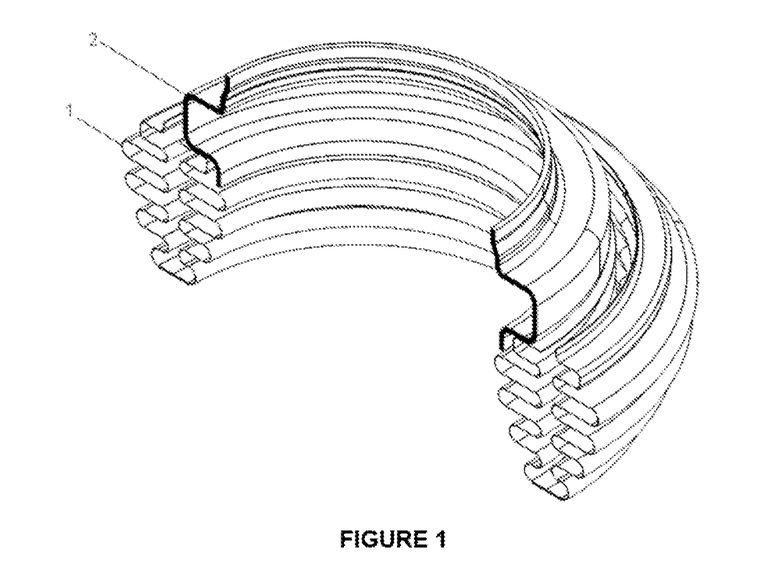
FIG. 1: Process for the production of bellows assemblies. Step 1. Product 1.
Figure 2:
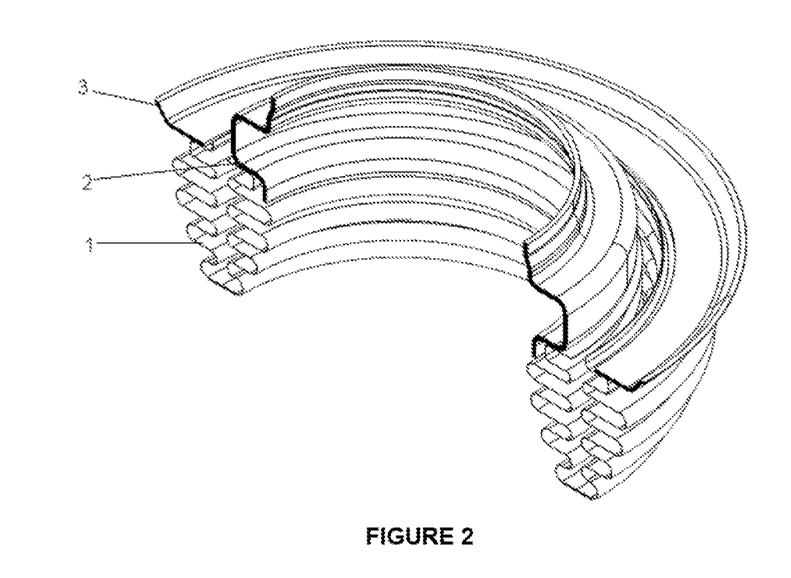
FIG. 2: Process for the production of bellows assemblies. Step 2. Product 2.
Figure 3:
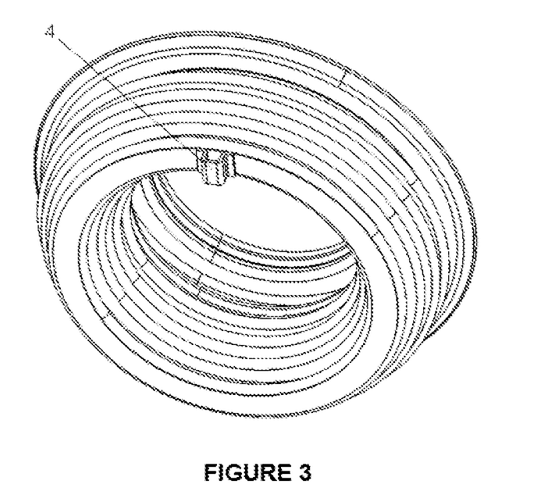
FIG. 3: Process for the production of bellows assemblies. Step 3. Product 3.
Figure 4:
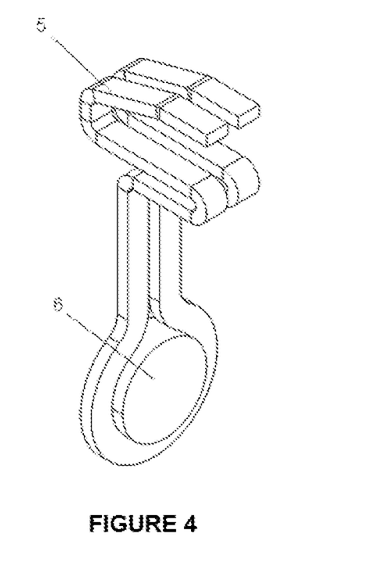
FIG. 4: Process for the production of bellows assemblies. Step 4. Product 4
Figure 5:
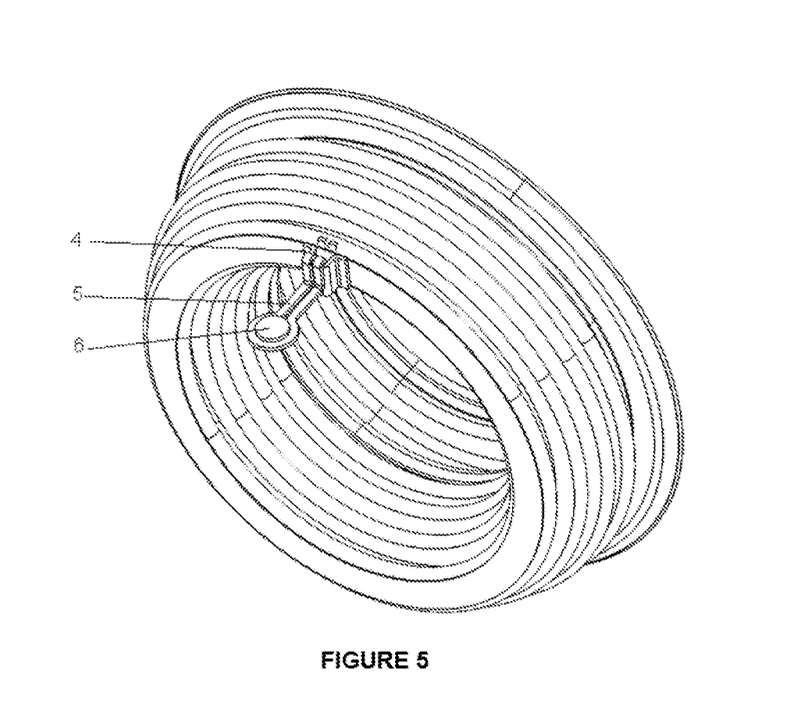
FIG. 5: Process for the production of bellows assemblies. Step 5. Product 5
Figure 6:
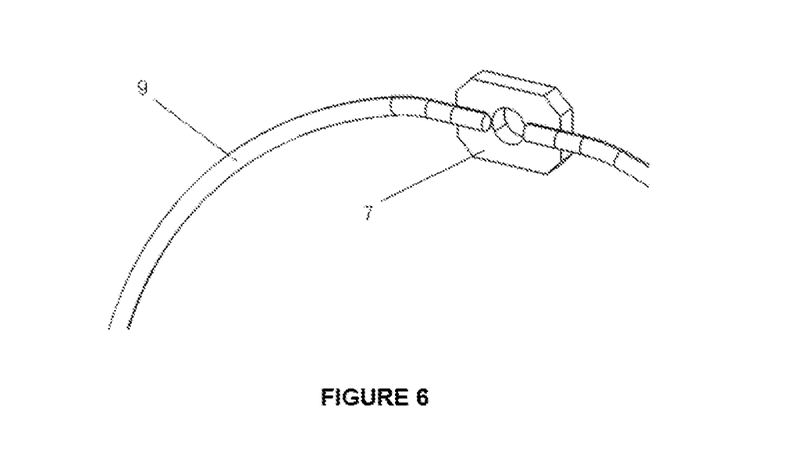
FIG. 6: Process for the production of bellows assemblies. Step 6. Product 6
Figure 7:
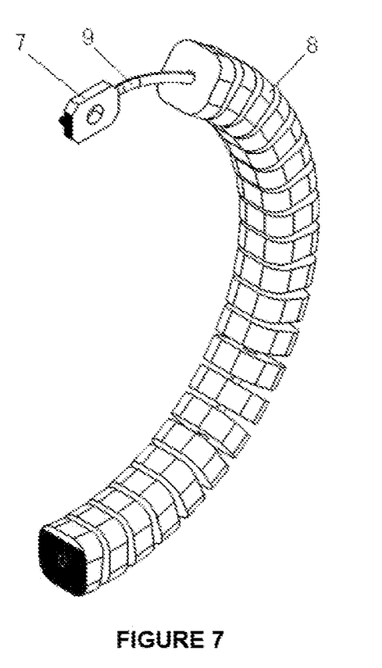
FIG. 7: Process for the production of bellows assemblies. Step 7. Product 7
Figure 8:
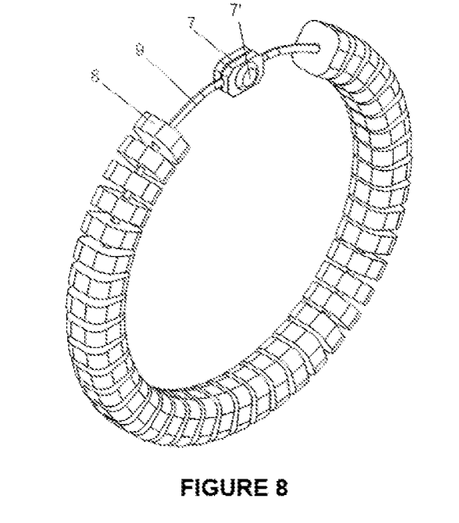
FIG. 8: Process for the production of bellows assemblies. Step 8. Product 8
Figure 9:
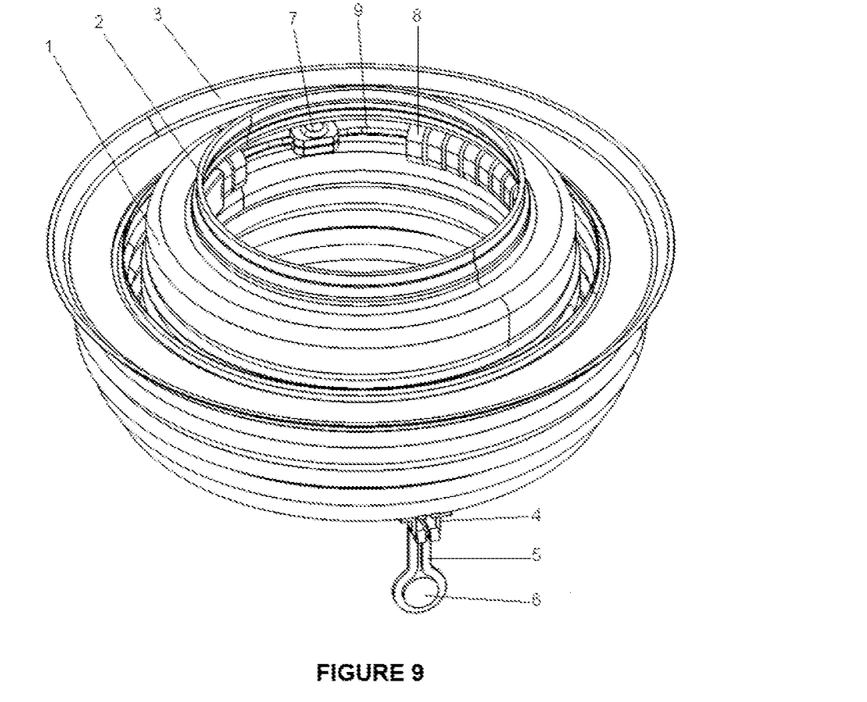
FIG. 9: Process for the production of bellows assemblies. Step 9. Product 9
Figure 10:
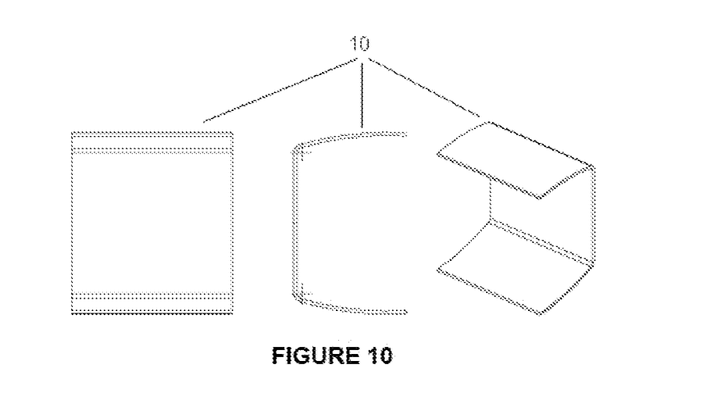
FIG. 10: Attachment clamps
Figure 11:
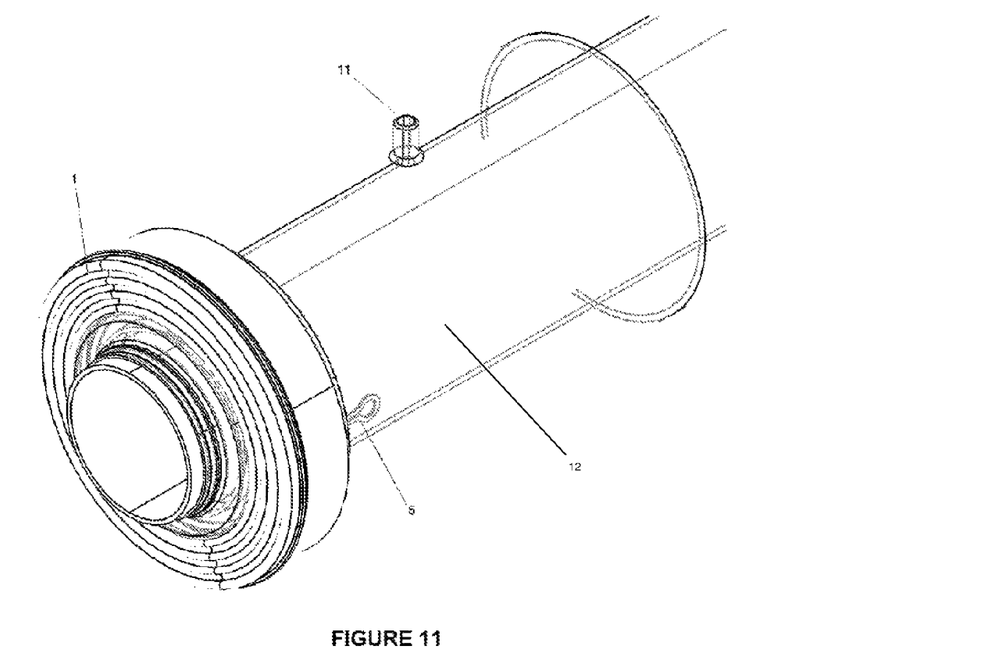
FIG. 11: End of the complete tube with a branched connector for producing vacuum
Figure 12:
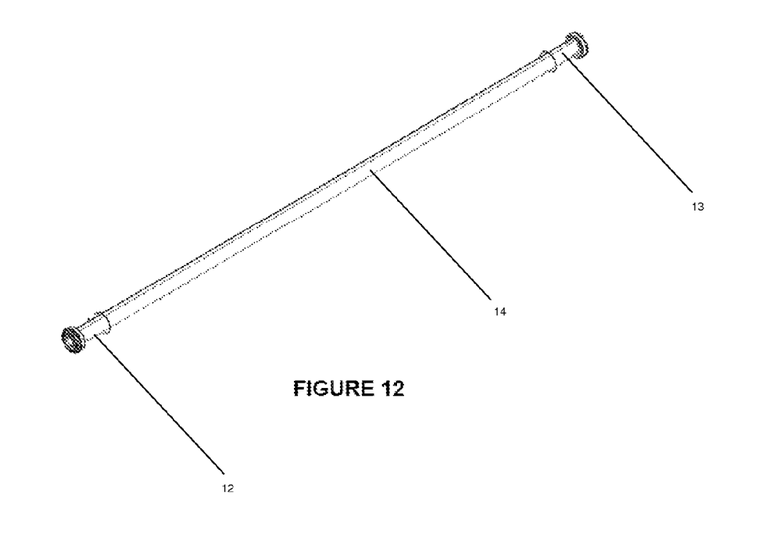
FIG. 12: Perspective view of the complete receiving tube.

To perform such a preload it is noted that all the described assembly processes have a welding step of the bellow assembly to the metal tube that is carried out, by welding the two bellows to the metal tube simultaneously or by welding first one side and then the other. This last way of proceeding has the drawback that, in order to introduce the preload in the bellows, all the preload corresponding to the two bellows has to be introduced first in one of them (which means that bellow supports a preload twice the nominal) and then proceeding to the welding of the other bellow, such that until the second bellow is not placed the preload is not distributed between both of them. Thus, in the case of introducing preload in the bellows, it would be convenient to use the assemblies where the positions of the bellows assemblies are coordinated on the metal tube independently among them, so as to not submit the bellows to an excessive load.

vii. Creates the vacuum in the intermediate area, between the glass tube and the metal tube and applying anodizing spray to the welds. FIG. 11 shows a branched connector (11) for the creation of that vacuum.

With this the final product, the receiving tube, prepared for its assembly in a solar concentration plant is obtained.

This system is especially designed for its application in the assembly of solar technology receiving tubes, but it does not preclude its extension to other areas of the industry that require similar features.

The invention claimed is:

1. A method for producing a solar power receiving tube comprising an outer glass tube, an inner metal absorber tube through which the heat-transfer fluid flows, and an intermediate area in which a vacuum is produced, the method comprising the following steps:
producing of the inner metal absorber tube;
producing glass tubes for forming the outer glass tube, comprising a longer central glass tube, and two shorter glass tubes for connecting to ends of the longer central glass tube to form the outer glass tube;
producing ASTM F-15 rings configured as glass-metal transition elements;
welding the ASTM F-15 rings to the shorter glass tubes;
welding the two shorter glass tubes to the longer central glass tube;
after the shorter glass tubes are welded to the ASTM F-15 rings and the two shorter glass tubes are welded to the longer central glass tube to form the outer glass tube, the outer glass tube is taken to the sol-gel station and the outer glass tube is cleaned through washing with water or ultrasound;
drying the outer glass tube;
immersing the outer glass tube in a vat to apply an anti-reflective coating thereto;
then reducing a temperature of the outer glass tube;
providing a hydrophobic treatment for achieving a water-repellent surface on the outer glass tube;
drying the outer glass tube with heat or air;
producing expansion compensating assemblies, wherein each of the expansion compensating assemblies includes a bellows-shaped device, a vessel, a cover, an evaporable getter, and non-evaporable getters, the producing process comprises:
welding the bellows-shaped device to the vessel,
welding the bellows-shaped device welded to the vessel to the cover,
welding an assembly of the non-evaporable getters to the vessel, and
assembling the evaporable getter;
assembling together the metal absorber tube, the outer glass tube, and the expansion compensating assemblies;
creation of the vacuum in the intermediate area; and
anodising welds,
wherein prior to welding the assembly of the non-evaporable getters, connecting the non-evaporable getters to a cable, wherein the cable has a closure with a female part and a male part, and joining the female part and the male part after the non-evaporable getters are disposed on the cable, and
wherein the assembling of the evaporable getter comprises disposing the evaporable getter to a circular end of a support having a clip.

2. The method for producing a solar power receiving tube according to claim 1, wherein the step of producing the metal absorber tube comprises:
polishing of the metal absorber tube;
cleaning of the metal absorber tube;
selectively coating the metal absorber tube using a sputtering technique; and
heating the metal absorber tube forming an outer oxide layer on which different layers can be applied.

3. The method for producing a solar power receiving tube according to claim 1, wherein the step of producing the outer glass tube includes producing a branched connector on one of the two shorter glass tubes, the branched connector being configured for creating the vacuum by a pump.

4. The method for producing a solar power receiving tube according to claim 1, wherein the step of producing the ASTM F-15 rings comprises manufacturing the ASTM F-15 rings manufactured as an iron, cobalt and nickel alloy.

5. The method for producing a solar power receiving tube according to claim 4, wherein
the welding of the short glass tubes to the ASTM F-15 rings comprises:
a glass-metal welding of a first of the two shorter glass tubes to one of the ASTM F-15 rings at an end of the first of the two shorter glass tubes, and
a glass-metal welding of a second of the two shorter glass tubes to another one of the ASTM F-15 rings at an end of the second of the two shorter glass tubes; and
the welding of the two shorter glass tubes to the longer central glass tube comprises:
glass-glass welding between a free end of the first of the two shorter glass tubes and an end of the longer glass tube, and
glass-glass welding between a free end of the second of the two shorter glass tubes and another end of the longer glass tube.

6. The method for producing a solar power receiving tube according to claim 5, further comprising:
after the two shorter glass tubes are welded to the ASTM F-15 rings by the glass-metal welding, performing a heat treatment for releasing stress, wherein the heat treatment is performed:
before taking the outer glass tube to the sol-gel station, or
after taking the outer glass tube to the sol-gel station and the immersing step of applying the anti-reflective coating.

7. A method for producing a solar power receiving tube, comprising an outer glass tube, an inner metal absorber tube through which the heat-transfer fluid flows, and an intermediate area in which a vacuum is produced, the method comprising the following steps:
producing the inner metal absorber tube;
producing glass tubes for forming the outer glass tube, comprising a longer central glass tube, and two shorter glass tubes for connecting to ends of the longer central glass tube to form the outer glass tube;
producing ASTM F-15 rings configured as glass-metal transition elements;
welding the ASTM F-15 rings to the shorter glass tubes;
welding the two shorter glass tubes to the longer central glass tube;
after the shorter glass tubes are welded to the ASTM F-15 rings and the two shorter glass tubes are welded to the longer central glass tube to form the outer glass tube, the outer glass tube is taken to the sol-gel station and the outer glass tube is cleaned through washing with water or ultrasound;
drying the outer glass tube;
immersing the outer glass tube in a vat to apply an anti-reflective coating thereto;
then reducing a temperature of the outer glass tube;
providing a hydrophobic treatment for achieving a water-repellent surface on the outer glass tube;
drying the outer glass tube with heat or air;
producing expansion compensating assemblies, wherein each of the expansion compensating assemblies includes a bellows-shaped device, a vessel, a cover, an evaporable getter, and non-evaporable getters, the producing process comprises:
welding the bellows-shaped device to the vessel,
welding the bellows-shaped device welded to the vessel to the cover,
welding an assembly of the non-evaporable getters to the vessel, and
assembling the evaporable getter;
assembling together the metal absorber tube, the outer glass tube, and the expansion compensating assemblies;
creation of the vacuum in the intermediate area;
anodising welds;
disposing at least a part of the metal absorber tube inside the outer glass tube;
then, welding the vessel of the expansion compensating assemblies to each end of the metal absorber tube; and
for each of the expansion compensating assemblies, welding the cover to one of the ASTM F-15 rings.

8. A method for producing a solar power receiving tube, comprising an outer glass tube, an inner metal absorber tube through which the heat-transfer fluid flows, and an intermediate area in which a vacuum is produced, the method comprising the following steps:
producing the inner metal absorber tube;
producing glass tubes for forming the outer glass tube, comprising a longer central glass tube, and two shorter glass tubes for connecting to ends of the longer central glass tube to form the outer glass tube;
producing ASTM F-15 rings configured as glass-metal transition elements;
welding the ASTM F-15 rings to the shorter glass tubes;
welding the two shorter glass tubes to the longer central glass tube;
after the shorter glass tubes are welded to the ASTM F-15 rings and the two shorter glass tubes are welded to the longer central glass tube to form the outer glass tube, the outer glass tube is taken to the sol-gel station and the outer glass tube is cleaned through washing with water or ultrasound;
drying the outer glass tube;
immersing the outer glass tube in a vat to apply an anti-reflective coating thereto;
then reducing a temperature of the outer glass tube;
providing a hydrophobic treatment for achieving a water-repellent surface on the outer glass tube;
drying the outer glass tube with heat or air;
producing expansion compensating assemblies, wherein each of the expansion compensating assemblies includes a bellows-shaped device, a vessel, a cover, an evaporable getter, and non-evaporable getters, the producing process comprises:
welding the bellows-shaped device to the vessel,
welding the bellows-shaped device welded to the vessel to the cover,
welding an assembly of the non-evaporable getters to the vessel, and
assembling the evaporable getter;
assembling together the metal absorber tube, the outer glass tube, and the expansion compensating assemblies;
creation of the vacuum in the intermediate area;
anodising welds;
for each of the expansion compensating assemblies, welding the cover to one of the ASTM F-15 rings;
then disposing at least a part of the metal absorber tube inside the outer glass tube; and
welding the vessel of the expansion compensating assemblies to a wall of the metal absorber tube.

9. The method for producing a solar power receiving tube according to claim 1, further comprising:
welding the cover of one of the expansion compensating assemblies to one of the ASTM F-15 rings;
then disposing at least a part of the metal absorber tube inside the outer glass tube via an un-welded end of the outer glass tube;
then welding the vessel of the one of the expansion compensating assemblies to the metal absorber tube;
then welding the vessel of the another one of the expansion compensating assemblies to the metal absorber tube; and
then welding the cover of another one of the expansion compensating assemblies to another one of the ASTM F-15 rings.

10. The method for producing a solar power receiving tube according to claim 1, further comprising:
welding the vessel of one of the expansion compensating assemblies to a first end of the metal absorber tube;
introducing the outer glass tube by the other end;
welding the cover of the one of the expansion compensating assemblies to one of the ASTM F-15 rings located at the first end of the outer glass tube;
disposing another one of the expansion compensating assemblies on the other end of the outer glass tube;
welding the vessel of the another one of the expansion compensating assemblies to the metal absorber tube; and
welding the cover of the another one of the expansion compensating assemblies to another one of the ASTM F-15 rings.

11. The method for producing a solar power receiving tube according to claim 7, further comprising:
preloading step of the expansion compensating assemblies before the step of welding the vessel to the metal tube.

12. A solar power receiving tube manufactured according to the method as in claim 1.

* * * * *